US009530588B2

(12) United States Patent
Johansson

(10) Patent No.: US 9,530,588 B2
(45) Date of Patent: Dec. 27, 2016

(54) CIRCUIT BREAKING ARRANGEMENT

(71) Applicant: ABB Technology Ltd, Zürich (CH)

(72) Inventor: Kenneth Johansson, Täby (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/780,424

(22) PCT Filed: Mar. 27, 2013

(86) PCT No.: PCT/EP2013/056491
§ 371 (c)(1),
(2) Date: Sep. 25, 2015

(87) PCT Pub. No.: WO2014/154260
PCT Pub. Date: Oct. 2, 2014

(65) Prior Publication Data

US 2016/0035509 A1 Feb. 4, 2016

(51) Int. Cl.
*H04B 3/54* (2006.01)
*H02J 1/00* (2006.01)
(Continued)

(52) U.S. Cl.
CPC ............. *H01H 9/42* (2013.01); *H01H 33/165* (2013.01); *H01H 33/596* (2013.01)

(58) Field of Classification Search
CPC ................. H02P 7/34; H02P 9/00; H02P 9/24; H02P 7/347; H02P 9/04; H02P 9/18; H02P 9/305; H02P 2101/30; H02P 25/20; H02P 5/68; H02P 5/74; H02P 7/20; H02P 9/02; H02P 9/26
(Continued)

(56) References Cited

U.S. PATENT DOCUMENTS 4,172,268 A * 10/1979 Yanabu ................ H01H 33/596 307/134
4,300,181 A 11/1981 Premerlani
(Continued)

FOREIGN PATENT DOCUMENTS

JP 5-89753 A 4/1993
WO WO 2011/050832 A 5/2011

*Primary Examiner* — Jung Kim
*Assistant Examiner* — Esayas Yeshaw
(74) *Attorney, Agent, or Firm* — Birch, Stewart, Kolasch & Birch, LLP

(57) ABSTRACT

A circuit breaking arrangement is disclosed, which is adapted to be coupled to a transmission line arranged to carry direct current for controllably effecting discontinuation of flow of direct current in the transmission line. The circuit breaking arrangement includes a current interrupter unit adapted to, when actuated, interrupt current in the transmission line and a first resonance circuit and at least a second resonance circuit. Each of the first and the at least a second resonance circuit is adapted to, upon actuation of the current interrupter unit and when the respective resonance circuit is activated, generate a resonance current superposing current of any arc generated in the current interrupter unit after actuation thereof. At least during a predefined period immediately after actuation of the current interrupter unit a resonance current that has been generated by the first resonance circuit flows into the current interrupter unit from a different direction than a resonance current generated by the second resonance circuit would have, or vice versa.

17 Claims, 4 Drawing Sheets

(51) Int. Cl.

| | |
|---|---|
| ***H02J 3/00*** | (2006.01) |
| ***H01H 9/42*** | (2006.01) |
| ***H01H 33/59*** | (2006.01) |
| ***H01H 33/16*** | (2006.01) |

(58) Field of Classification Search
USPC .............................................................. 307/8
See application file for complete search history.

(56) References Cited

U.S. PATENT DOCUMENTS

| | | | | |
|---|---|---|---|---|
| 5,164,872 | A | 11/1992 | Howell | |
| 5,737,162 | A * | 4/1998 | Ito | H01H 33/596 361/13 |
| 5,854,729 | A * | 12/1998 | Degeneff | H01H 33/596 361/13 |
| 6,456,025 | B2 * | 9/2002 | Berkowitz | H01H 33/36 307/139 |
| 7,355,831 | B2 | 4/2008 | Raiser | |
| 9,178,348 | B2 * | 11/2015 | Gaxiola | H01H 33/596 |
| 2009/0201617 | A1 * | 8/2009 | Yamaguchi | H01H 9/40 361/93.9 |
| 2011/0222651 | A1 * | 9/2011 | Ogawa | H02M 7/53871 378/20 |
| 2013/0308358 | A1 * | 11/2013 | Usami | H02M 7/04 363/84 |

* cited by examiner

CIRCUIT BREAKING ARRANGEMENT

FIELD OF THE INVENTION

The present invention generally relates to power systems e.g. for transmission of power. Specifically, the present invention relates to a circuit breaking arrangement for use e.g. in a power system.

BACKGROUND OF THE INVENTION

Power systems such as electrical power distribution or transmission systems generally include a protection system for protecting, monitoring and controlling the operation and/or functionality of other components included in the power system. Such protection systems may for example be able to detect short circuits, overcurrents and overvoltages in power lines, transformers and/or other parts or components of the power system. The protection systems can include protection equipment such as circuit breakers for isolating any possible faults for example occurring in power transmission and distribution lines by opening or tripping the circuit breakers. After the fault has been cleared, e.g. by performing repairs and/or maintenance on the component in which the fault has been detected, the power flow can be restored by closing the circuit breakers. In alternative or in addition, the protection systems can be arranged to, upon detection of a fault in a particular route for power flow, isolate the route in which the fault has been detected and select an alternative route for the power flow.

Operation of the circuit breakers may be responsive to detection of a fault condition or fault current. Upon detection of a fault condition or fault current, a mechanism may operate the circuit breaker so as to interrupt the current flowing there through. Once a fault has been detected, contacts within the circuit breaker may separate in order to interrupt the current there through. Spring arrangements, pneumatic arrangements or some other means utilizing mechanically stored energy may be employed to separate the contacts. Hence, mechanical current interrupters may for example be employed in circuit breakers. In alternative or in addition, solid-state interrupters based on semiconductor devices may be employed in the circuit breakers. When interrupting the current flowing in the electrical circuit, an arc is in general generated. Such an arc may be referred to as a fault current arc. In order to break the current in the electrical circuit, it may be required or desired to extinguish such an arc. Once the fault condition has been mitigated or eliminated the contacts can be closed so as to resume flow of current through the circuit breaker.

High Voltage Direct Current (HVDC) power transmission is becoming increasingly important due to the increasing need for power supply or delivery and interconnected power transmission and distribution systems. An HVDC grid or a DC grid may comprise multiple alternating current (AC)/DC converter terminals interconnected by transmission lines, e.g., underground cables and/or overhead lines. Within the grid, a terminal may be connected to multiple terminals resulting in different types of topologies. DC circuit breakers can be used for isolating faulty components, such as transmission lines, in HVDC and DC grids. Unlike AC circuit breakers, there are no natural current zeros at which a fault current arc may be extinguished in DC circuit breakers. Instead, it may be desired or even required to create a current zero when utilizing DC circuit breakers.

One example of a way to create current zero in order to extinguish a fault current arc in a current interrupter in a DC circuit breaker is to employ a so called resonance circuit connected in parallel with the current interrupter. The resonance circuit may in alternative be referred to as an oscillation circuit or an injection circuit. Under certain conditions the resonance circuit can become unstable, whereby an oscillation starts to grow, wherein a high frequency current, or resonance current or injection current, created in the resonance circuit superposes the fault current and generates current zero, at which point the fault current arc can be extinguished. The resonance circuit may for example comprise an inductor, a capacitor and possibly a switch element connected in series. During normal operation, i.e. when no fault has been detected or no fault current has been sensed, the current interrupter is closed and the switch element in the resonance circuit is open. Upon reception of a trip signal, which e.g. may be issued by an external control unit or a protective unit of an HVDC power transmission system in which DC circuit breaker is included, the current interrupter is opened by separating contacts therein to interrupt the direct current through the DC circuit breaker. Upon interrupting or breaking the direct current, a current is carried between the contacts of the current interrupter through an arc. Thus, a fault current arc is created between the contacts in the current interrupter. It is generally desired or even required to extinguish the fault current arc in order to break the current through the DC circuit breaker. A short time after the current interrupter has been opened, typically after about one or a few milliseconds, depending e.g. on how much the contacts have been separated, the switch element in the resonance circuit is closed. In order to start the oscillation, the capacitor in the resonance circuit may need to be charged. Once the capacitor has been charged (with a certain polarity), it will discharge via one of its ends or capacitor plates through the inductor in the resonance circuit. As the capacitor discharges, the inductor will create a magnetic field. Then, once the capacitor has been discharged, the inductor will charge the capacitor via the other end or capacitor plate of the capacitor. Once the magnetic field of the inductor collapses, the capacitor has been recharged (but with the opposite polarity), and so it may discharge again through the inductor. The thus created resonance current can be made to superpose the fault current and generate current zero, at which point the fault current arc can be extinguished.

However, there is still a need in the art for improved DC circuit breaking arrangements which can provide an improved performance with respect to operation compared to known DC circuit breaking arrangements.

SUMMARY OF THE INVENTION

A resonance circuit such as described in the foregoing which is used to create current zero to extinguish the fault current arc in a DC circuit breaker should preferably be arranged such that the first half period or cycle of the generated resonance current has an opposite direction through the current interrupter compared to the fault current, i.e. the current that is carried between the contacts of the current interrupter through an arc, which shall be extinguished. In other words, it would be desirable to be able to choose the polarity of the resonance current, e.g. depending on the magnitude and/or direction of the fault current. Particularly for a DC circuit breaker arranged in an HVDC grid or a DC grid, a fault current through the current interrupter may in general have any direction, so there is no preferred charging polarity of a capacitor in the resonance circuit. If one had the freedom to choose, it would possibly be better to charge the capacitor with the opposite polarity as compared to the polarity of the DC line voltage in order to keep the total voltage to ground at a relatively low level or even as low as possible. At the same time, it would be advantageous to have two, or even more than two, resonance circuits in the DC circuit breaker to be able to relatively quickly interrupt the current by operating the DC circuit breaker again after having closed it, in case a fault persists in the DC line. However, in particular in case of having resonance circuits of the type including a capacitor and an inductor connected in series, charging two capacitors with different polarities may be difficult or even impossible since there might be created a very high constant DC voltage between them.

In view of the above discussion, a concern of the present invention is to provide a circuit breaking arrangement capable of interrupting direct current, which circuit breaking arrangement provides an improved performance with respect to operation compared to known DC circuit breaking arrangements.

A further concern of the present invention is to provide or achieve a circuit breaking arrangement capable of interrupting direct current, which circuit breaking arrangement facilitates or even enables the capability of choosing the polarity of the resonance current, preferably selectively and/or controllably, e.g. depending on the magnitude and/or direction of a fault current.

A further concern of the present invention is to provide or achieve a circuit breaking arrangement capable of interrupting direct current, which circuit breaking arrangement facilitates or even enables providing redundancy with respect to availability of resonance circuits.

A further concern of the present invention is to provide or achieve a circuit breaking arrangement capable of interrupting direct current, which circuit breaking arrangement facilitates or even enables a capability to relatively quickly interrupt the current in a DC line by operating the current interrupter again after having closed it, in case a fault persists in the DC line.

To address at least one of these concerns and other concerns, a circuit breaking arrangement and a computer program product in accordance with the independent claims are provided. Preferred embodiments are defined by the dependent claims.

According to a first aspect of the present invention, there is provided a circuit breaking arrangement which is adapted to be coupled to a transmission line arranged to carry direct current for controllably effecting discontinuation of flow of direct current in the transmission line. The circuit breaking arrangement comprises a current interrupter unit which is adapted to, when actuated, interrupt current in the transmission line. The circuit breaking arrangement comprises a first resonance circuit and at least a second resonance circuit. Each of the first and the at least a second resonance circuit is connected in parallel with the current interrupter unit. Each of the first and the at least a second resonance circuit is adapted to, upon actuation of the current interrupter unit and when the respective one of the first and the at least a second resonance circuit is activated, generate a resonance current superposing current of any arc generated in the current interrupter unit after actuation thereof. The first and the at least a second resonance circuit are arranged relatively to each other and the current interrupter unit such that, at least during a predefined period immediately after actuation of the current interrupter unit, a resonance current generated by the first resonance circuit flows into the current interrupter unit from a different direction compared to a resonance current generated by the second resonance circuit.

The first aspect is at least in part based on a realization that more than one resonance circuit can be utilized in a circuit breaking arrangement and be arranged so as to allow for charging respective capacitors in the resonance circuits with the same polarity, and/or such that the capacitors' charged side voltage will be at or substantially at ground potential, or possibly at a voltage in a relatively small voltage interval immediately below the DC line voltage, or at a voltage that is lower than the ground potential, and optionally or in addition allowing for resonance currents generated by the respective resonance circuits to have different directions at least when flowing through the current interrupter unit, at least during a predefined period immediately after actuation of the current interrupter unit. Thereby, a resonance circuit among the first and the at least a second resonance circuit can be chosen to be utilized in a circuit breaking operation so as to achieve a desired or required polarity of a resonance current utilized in the circuit breaking operation, e.g. depending on a direction and/or magnitude of a fault current. Thus, selective choice of polarity, in particular choice of polarity of the injection or resonance current during the first half period of the resonance current, may be facilitated or enabled, and at the same time, in view of the multiple resonance circuits, redundancy with respect to availability of resonance circuits may be facilitated or enabled, which in turn may facilitate or enable the ability to relatively quickly interrupt the current in a DC line by operating the current interrupter unit again after having closed it, in case a fault persists in the DC line.

Arranging the first and the at least a second resonance circuit relatively to each other and the current interrupter unit such that, at least during a predefined period immediately after actuation of the current interrupter unit, a resonance current generated by the first resonance circuit flows into the current interrupter unit from a different direction compared to a resonance current generated by the second resonance circuit, may allow for choosing which resonance circuit to activate, e.g. in view of a direction and/or magnitude of a fault current, so as to be able to create a current zero at which any current that is carried between the contacts of the current interrupter unit through an arc can be extinguished in a relatively short time or even the shortest time compared to other resonance circuits. Thereby, the speed of performing breaking of current through the circuit breaking arrangement by operation of the circuit breaking arrangement may be increased.

The circuit breaking arrangement may comprise a current sensing unit adapted to sense at least a direction of current, e.g. direct current, flowing into the current interrupter unit, e.g. prior to actuation thereof. For example, the current sensing unit may be adapted to sense at least a direction of direct current flowing into the current interrupter unit before the current interrupter unit has been actuated, so that the current direction sensed by the current sensing unit is the direction of the fault current, and not the direction of any resonance current. In alternative or in addition, the current sensing unit may be adapted to sense e.g. a magnitude of current flowing into the current interrupter unit.

The circuit breaking arrangement may comprise a control unit, which may be coupled to the current sensing unit and to each of the first and the at least a second resonance circuit.

The control unit may be adapted to, based on the sensed current direction, selectively activate at least one of the first and the at least a second resonance circuit so that at least one resonance current is generated which superposes current of any arc generated in the current interrupter unit after actuation thereof, which generated at least one resonance current has an opposite direction to the sensed current direction at least during the predefined period immediately after actuation of the current interrupter unit. Thereby, based on direction and/or magnitude of e.g. a fault current, a resonance circuit, which when activated so as to create a resonance current is capable of creating a current zero in a relatively short time or even the shortest time compared to other resonance circuits, may be controllably selected among the available resonance circuits in the circuit breaking arrangement. Thereby, the speed of performing breaking of current through the circuit breaking arrangement by operation of the circuit breaking arrangement may be increased.

The predefined period may for example be the first half cycle or period of the resonance current.

The first resonance circuit may be connected in parallel with the second resonance circuit, or vice versa. In case of more than two resonance circuits being included in the circuit breaking arrangement, one or more additional resonance circuits may be connected in parallel with the current interrupter unit and/or the first and/or second resonance circuit. Each of the first and the at least a second resonance circuit may include at least one capacitor, at least one inductor and a switch element, which at least one capacitor, at least one inductor and switch element may be connected in series. For any one of the first and the at least a second resonance circuit, the resonance current may be generated upon closing of the switch element by means of successive discharging and charging of the at least one capacitor in the respective resonance circuit.

The respective ones of the capacitors in the first and second resonance circuits may be arranged so that the charging polarities of the respective ones of the capacitors in the first and second resonance circuits are such that, at least during the predefined period immediately after actuation of the current interrupter unit, a resonance current generated by the first resonance circuit flows into the current interrupter unit from a different direction compared to a resonance current generated by the second resonance circuit.

In case the first and/or the at least a second resonance circuit is of a type that includes a capacitor, e.g. such as described in the foregoing, the arrangement of the resonance circuits, and in particular the arrangement of the respective capacitors, with respect to the current interrupter unit may be such that the respective capacitors are charged with the same polarity. In other words, the respective ones of the capacitors in the first and second resonance circuits may be arranged so that the charging polarities of the respective ones of the capacitors in the first and second resonance circuits are the same.

The charging of the capacitor of the first and/or the at least a second resonance circuit may be such that the respective capacitors' charged side voltage is at or substantially at ground potential, or possibly at a voltage in a relatively small voltage interval immediately below the DC line (transmission line) voltage, or at a voltage that is lower than the ground potential, or at any voltage between the DC line (transmission line) voltage and the ground potential (or lower).

In order to activate the first resonance circuit and/or the at least a second resonance circuit, the capacitor of the first and/or the at least a second resonance circuit, respectively, may be precharged.

According to a second aspect of the present invention, there is provided a power system including a transmission line arranged to carry direct current and a circuit breaking arrangement according to the first aspect of the present invention. The circuit breaking arrangement is coupled to the transmission line for controllably effecting discontinuation of flow of direct current in the transmission line.

The power system may for example comprise an HVDC power transmission system.

According to a third aspect of the present invention, there is provided a computer program product adapted to be executed in a control unit of a circuit breaking arrangement. The circuit breaking arrangement is adapted to be coupled to a transmission line arranged to carry direct current for controllably effecting discontinuation of flow of direct current in the transmission line. The circuit breaking arrangement comprises a current interrupter unit adapted to, when actuated, interrupt current in the transmission line. The circuit breaking arrangement comprises a first resonance circuit and at least a second resonance circuit. Each of the first and the at least a second resonance circuit is connected in parallel with the current interrupter unit. The circuit breaking arrangement comprises a current sensing unit adapted to sense at least a direction of direct current flowing into the current interrupter unit prior to actuation thereof. The control unit is coupled to the current sensing unit and to each of the first and the at least a second resonance circuit. Each of the first and the at least a second resonance circuit is adapted to, upon actuation of the current interrupter unit and when the respective resonance circuit is activated, generate a resonance current superposing current of any arc generated in the current interrupter unit after actuation thereof. The first and the at least a second resonance circuit are arranged relatively to each other and the current interrupter unit such that, at least during a predefined period immediately after actuation of the current interrupter unit, a resonance current generated by the first resonance circuit flows into the current interrupter unit from a different direction compared to a resonance current generated by the second resonance circuit. The computer program product comprises computer-readable means carrying computer program code configured to, when executed in the control unit of the circuit breaking arrangement, cause the current sensing unit to sense a direction of direct current flowing into the current interrupter unit. The computer program code is configured to, when executed in the control unit of the circuit breaking arrangement, cause actuation of the current interrupter unit to interrupt current in the transmission line. The computer program code is configured to, when executed in the control unit of the circuit breaking arrangement, selectively activate at least one of the first and the at least a second resonance circuit based on the sensed current direction so that at least one resonance current is generated which superposes current of any arc generated in the current interrupter unit after actuation thereof, which generated at least one resonance current has an opposite direction to the sensed current direction at least during the predefined period immediately after actuation of the current interrupter unit.

Sensing of a direction of direct current flowing into the current interrupter unit and/or actuation of the current interrupter unit to interrupt current in the transmission line may be responsive to e.g. the control unit receiving a signal indicating that discontinuation of flow of current in the transmission line is desired or required. The signal may for example be issued by an external control unit or a protective unit of a power system in which the transmission line and/or circuit breaking arrangement is included.

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the other accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to the same or similar elements or components throughout.

Figure 1:
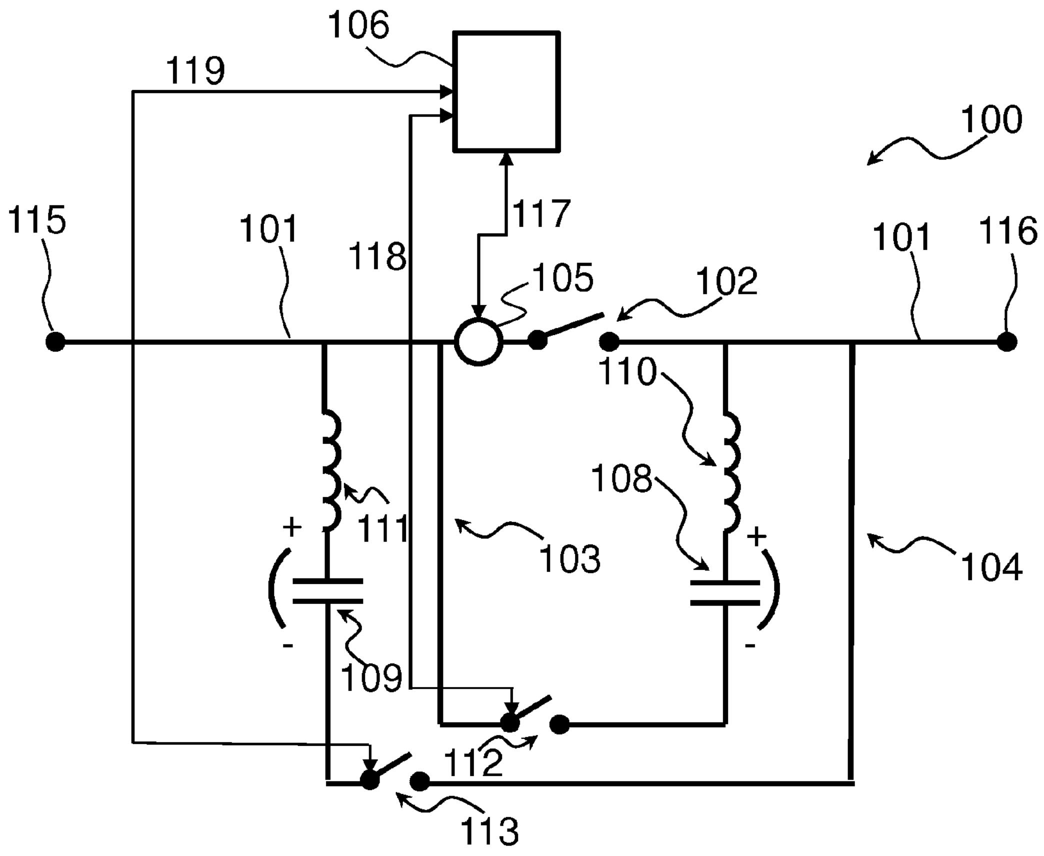
FIG. 1 is a schematic view of a circuit breaking arrangement according to an embodiment of the present invention.

Referring now to FIG. 1, there is shown a schematic view of a circuit breaking arrangement 100 according to an embodiment of the present invention. The circuit breaking arrangement 100 is adapted to be coupled to a transmission line 101, arranged to carry direct current, for controllably effecting discontinuation of flow of direct current in the transmission line 101.

In FIG. 1, a portion of transmission line 101 is shown, which portion of transmission line 101 is arranged to carry direct current between terminals 115 and 116. It is to be understood that the transmission line 101 may be included in a power system (not shown in FIG. 1), e.g. a power transmission system such as an HVDC power transmission system or an HVDC grid or a DC grid.

The transmission line 101 may for example be a power transmission line such as a DC cable, an overhead line (OHL) or a combination of DC cable and OHL.

The circuit breaking arrangement 100 comprises a current interrupter unit 102, which for example may include or be constituted by a mechanical interrupter and/or a solid-state interrupter based on semiconductor devices.

The current interrupter unit 102 can be actuated, preferably selectively and/or controllably, and is adapted to, when actuated, interrupt current in the transmission line 101.

The circuit breaking arrangement 100 comprises a first resonance circuit 103 and a second resonance circuit 104. Each of the first resonance circuit 103 and the second resonance circuit 104 is connected in parallel with the current interrupter unit 102.

According to the embodiment depicted in FIG. 1, the first resonance circuit 103 includes a capacitor 108, an inductor 110 and a switch element 112 connected in series. The second resonance circuit 104 includes a capacitor 109, an inductor 111 and a switch element 113 connected in series.

In accordance with the embodiment depicted in FIG. 1, the first resonance circuit 103 may be connected in parallel with the second resonance circuit 104, or vice versa.

The circuit breaking arrangement 100 may include more than two resonance circuits 103, 104. In case of more than two resonance circuits being included in the circuit breaking arrangement 100, one or more additional resonance circuits, each possibly including a capacitor, an inductor and a switch element connected in series such as in resonance circuits 103, 104, may be connected in parallel with the current interrupter unit 102 and/or the first resonance circuit 103 and/or second resonance circuit 104.

When the current interrupter 102 is actuated so as to interrupt or break the direct current in the transmission line 101, a current is carried between the contacts (not shown in FIG. 1) of the current interrupter unit 102 through an arc. The current carried between the contacts of the current interrupter unit 102 through an arc may be referred to as a fault current arc, which hence is created between the contacts in the current interrupter unit 102.

Each of the first resonance circuit 103 and the second resonance circuit 104 can be activated, preferably selectively and/or controllably, so as to generate a resonance current. Each of the first resonance circuit 103 and the second resonance circuit 104 is adapted to, upon actuation of the current interrupter unit 102 and when the respective one of the first resonance circuit 103 and the second resonance circuit 104 is activated, generate, preferably selectively and controllably, a resonance current superposing current of any arc generated in the current interrupter unit 102 after actuation thereof, i.e. after the current interrupter unit 102 has been operated so as to interrupt or break direct current in the transmission line 101.

As exemplified in FIG. 1, the first resonance circuit 103 and the second resonance circuit 104 are arranged relatively to each other and the current interrupter unit 102 such that, at least during a predefined period immediately after actuation of the current interrupter unit 102, a resonance current generated by the first resonance circuit 103 flows into the current interrupter unit 102 from a different direction compared to a resonance current generated by the second resonance circuit 104.

The predefined period may for example be the first half cycle or period of the generated resonance current.

For any one of the first resonance circuit 103 and the second resonance circuit 104, the resonance current may be generated upon closing of the switch element 112 and 113, respectively, by means of successive discharging and charging of the capacitor 108 and 109, respectively, in the respective resonance circuit 103, 104.

In order to illustrate principles of embodiments of the present invention, consider the following example. In the following example the first resonance circuit 103 is considered, but the same or similar principles may be applied to the second resonance circuit 104, or to any other additional resonance circuit which may be included in the circuit breaking arrangement 100. In order to activate the first resonance circuit 103 to start an oscillation that creates the resonance current, the capacitor 108 may be precharged. Once the capacitor 108 has been charged, with a certain polarity, it will discharge via one of its ends or capacitor plates through the inductor 110. As the capacitor 108 discharges, the inductor 110 will create a magnetic field. Then, once the capacitor 108 has been discharged, the inductor 110 will charge the capacitor 108 via the other end or capacitor plate of the capacitor 108. Once the magnetic field of the inductor 110 collapses, the capacitor 108 has been recharged, but with the opposite polarity compared to the previous charging, and so the capacitor 108 may discharge again through the inductor 110. The thus created resonance current can be made to superpose the fault current and generate current zero, at which point the fault current arc can be extinguished.

In accordance with the embodiment depicted in FIG. 1, the respective ones of the capacitors 108, 109 in the first resonance circuit 103 and the second resonance circuit 104 may be arranged so that the charging polarities of the respective ones of the capacitors 108, 109 in the first resonance circuit 103 and the second resonance circuit 104 are such that, at least during the predefined period immediately after actuation of the current interrupter unit 102, a resonance current generated by the first resonance circuit 103 flows into the current interrupter unit 102 from a different direction compared to a resonance current generated by the second resonance circuit 104. For example, the respective ones of the capacitors 108, 109 in the first resonance circuit 103 and the second resonance circuit 104 can be arranged so that the charging polarities of the capacitors 108, 109 are the same. This may facilitate or enable choosing a resonance circuit among the first resonance circuit 103 and the second resonance circuit 104 so as to achieve a desired or required polarity of a resonance current that is utilized in the circuit breaking operation of the circuit breaking arrangement 100, e.g. depending on a direction and/or magnitude of a fault current.

During operation of the circuit breaking arrangement 100, a relatively short time after the current interrupter unit 102 has been actuated or opened, typically after about one or a few milliseconds, depending e.g. on how much the contacts of the current interrupter unit 102 have been separated, the switch element 112, 113 in the first resonance circuit 103 and/or the second resonance circuit 104 may be closed.

In accordance with the embodiment depicted in FIG. 1, the circuit breaking arrangement 100 may comprise a current sensing unit 105 adapted to sense at least a direction of current, e.g. direct current, flowing into the current interrupter unit 102, e.g. prior to actuation thereof. For example, the current sensing unit 105 may be adapted to sense at least a direction of direct current flowing into the current interrupter unit 102 before the current interrupter unit 102 has been actuated, so that the current direction sensed by the current sensing unit 105 is the direction of the fault current, and not the direction of any generated resonance current.

The position and/or arrangement of the current sensing unit 105 in the current breaking arrangement 100 as shown in FIG. 1 is according to a non-limiting example. The current sensing unit 105 may be arranged to sense at least a direction, and/or possibly a magnitude, of current in the transmission line 101 in principle at any point between terminals 115 and 116. For example, the current sensing unit 105 may be arranged to sense at least a direction, and/or possibly a magnitude, of current in the transmission line 101 flowing into the current interrupter unit 102 from either or both of the line sides of the current interrupter unit 102.

In accordance with the embodiment depicted in FIG. 1, the circuit breaking arrangement 100 may comprise a control unit 106, which, as indicated in FIG. 1 by reference numerals 117, 118 and 119, respectively, may be coupled to the current sensing unit 105, to the first resonance circuit 103 and to the second resonance circuit 104, or in particular to switch elements 112, 113 of the first resonance circuit 103 and the second resonance circuit 104, respectively, as illustrated in FIG. 1. Thereby, the control unit 106 may be capable of operating the current sensing unit 105, and activation and deactivation of the resonance circuits 103, 104, e.g. by opening and closing of the switch elements 112, 113.

The control, and/or processing, unit 106 of the circuit breaking arrangement 100 may include or be constituted for example by any suitable central processing unit (CPU), microcontroller, digital signal processor (DSP), Application Specific Integrated Circuit (ASIC), Field Programmable Gate Array (FPGA), etc., or any combination thereof. The control unit 106 may optionally be capable of executing software instructions stored in a computer program product e.g. in the form of a memory (not shown in FIG. 1). The memory may for example be any combination of read and write memory (RAM) and read only memory (ROM). The memory may comprise persistent storage, which for example can be a magnetic memory, an optical memory, a solid state memory or a remotely mounted memory, or any combination thereof.

The control unit 106 may be coupled to the current sensing unit 105, to the first resonance circuit 103 and to the second resonance circuit 104, respectively, e.g. so as to at least enable communication of signals, messages, instructions and/or data between the control unit 106 and the current sensing unit 105, the first resonance circuit 103 and the second resonance circuit 104, respectively (indicated by reference numerals 117, 118 and 119, respectively, in FIG. 1).

The control unit 106 may be adapted to, based on the sensed current direction by current sensing unit 105, selectively activate at least one of the first resonance circuit 103 and the second resonance circuit 104 so that at least one resonance current is generated which superposes current of any arc generated in the current interrupter unit 102 after actuation thereof, which generated at least one resonance current has an opposite direction to the sensed current direction at least during the predefined period immediately after actuation of the current interrupter unit 102.

According to the circuit breaking arrangement 100 illustrated in FIG. 1, the capacitors 108, 109 will be charged with the same polarity, in view of the arrangement of the resonance circuits 103, 104 and in particular the arrangement of capacitors 108 and 109, respectively, with respect to the current interrupter unit 102.

The charging of the capacitor 108 and/or the capacitor 109 may be such that the capacitors' 108, 109 charged side voltage is at or substantially at ground potential, or possibly at a voltage in a relatively small voltage interval immediately below the DC line (transmission line 101) voltage, or at a voltage that is lower than the ground potential, or at any voltage between the DC line (transmission line) voltage and the ground potential (or lower).

In order to activate the first resonance circuit 103 and/or the second resonance circuit 104, the capacitor 108 and/or the capacitor 109, respectively, may be precharged.

The circuit breaking arrangement 100 may allow for choice of polarity, in particular choice of polarity of the injection or resonance current during the first half period of the resonance current, and at the same time, in view of the multiple resonance circuits 103, 104, redundancy with respect to availability of resonance circuits, which in turn may facilitate or enable the ability to relatively quickly interrupt the current in the transmission line 101 by operating the current interrupter unit 102 again after having closed it, in case a fault persists in the transmission line 101.

Figure 2:
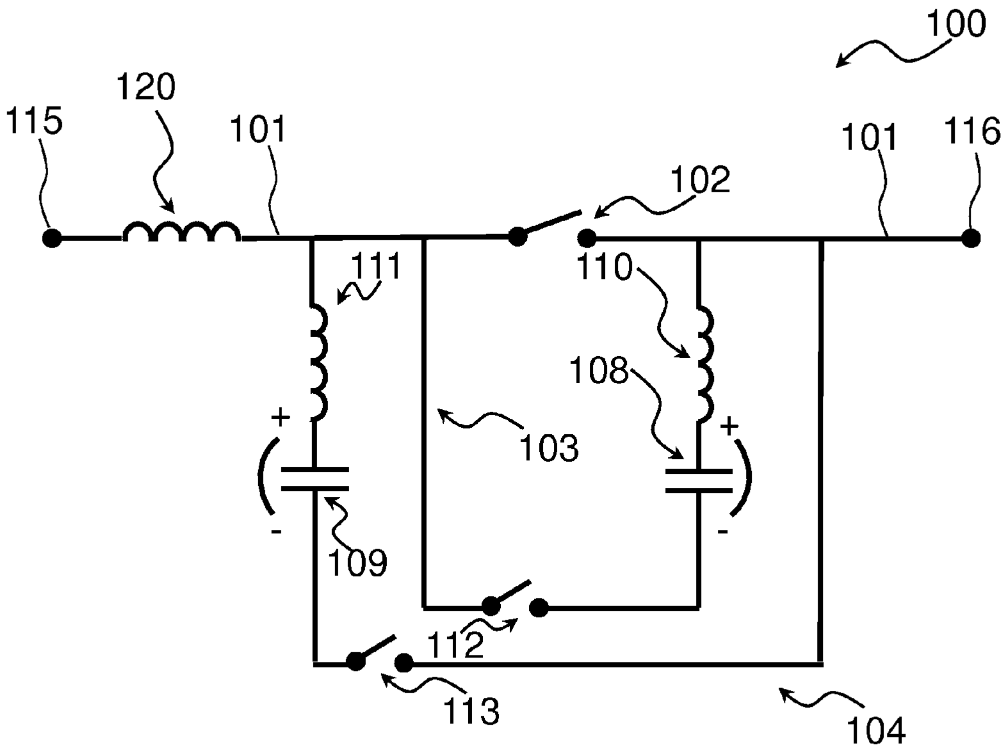
FIG. 2 is a schematic view of a circuit breaking arrangement according to another embodiment of the present invention.

Referring now to FIG. 2, there is shown a schematic view of a circuit breaking arrangement 100 according to another embodiment of the present invention. The circuit breaking arrangement 100 depicted in FIG. 2 is similar to the circuit breaking arrangement 100 depicted in FIG. 1. However, in contrast to the circuit breaking arrangement 100 depicted in FIG. 1, the circuit breaking arrangement 100 depicted in FIG. 2 includes an inductor 120, which e.g. may be arranged between terminal 115 and current interrupter unit 102 as shown in FIG. 2. The inductor 120 may act as a current limiter to reduce a time derivative or rise time of any fault current in the transmission line 101, and in particular in the current interrupter unit 102.

Figure 3:
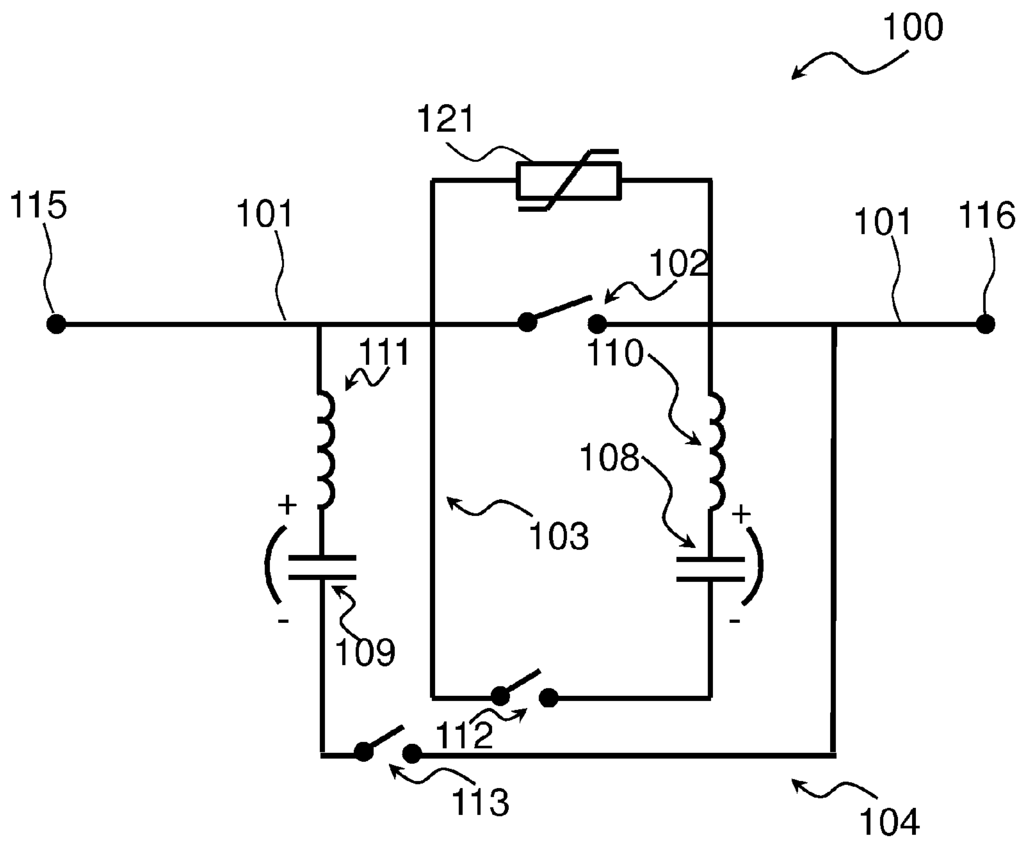
FIG. 3 is a schematic view of a circuit breaking arrangement according to yet another embodiment of the present invention.

Referring now to FIG. 3, there is shown a schematic view of a circuit breaking arrangement 100 according to yet another embodiment of the present invention. The circuit breaking arrangement 100 depicted in FIG. 3 is similar to the circuit breaking arrangements 100 depicted in FIGS. 1 and 2. However, in contrast to either of the circuit breaking arrangements 100 depicted in FIGS. 1 and 2, the circuit breaking arrangement 100 depicted in FIG. 3 includes a non-linear resistor 121, which e.g. may include a surge arrester, coupled in parallel with the current interrupter unit 102. The non-linear resistor 121 may allow for using a current interrupter unit 102 having a reduced capacity to withstand relatively high voltages, by reducing or limiting the voltage over current interrupter unit 102 when direct current is flowing through the current interrupter unit 102.

It is to be understood that even though a current sensing unit 105 and a control unit 106 such as illustrated in FIG. 1 are not explicitly shown in FIGS. 2 and 3, it is contemplated that any one of the embodiments depicted in FIGS. 2 and 3 may include a current sensing unit 105 and/or a control unit 106 such as illustrated in FIG. 1. The operation, function and/or arrangement of any current sensing unit and/or a control unit included in any one of the circuit breaking arrangements depicted in FIGS. 2 and 3 may be similar to or the same as the operation, function and/or arrangement of the current sensing unit 105 and control unit 106 in the circuit breaking arrangement 100 depicted in FIG. 1.

Figure 4:
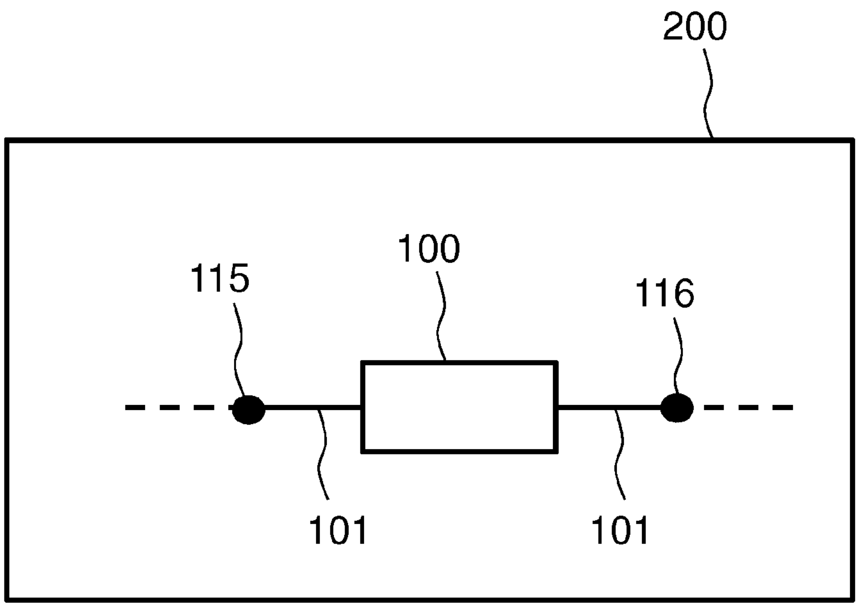
FIG. 4 is a schematic block diagram of a power system according to an embodiment of the present invention.

Referring now to FIG. 4, there is shown a schematic block diagram of a power system 200 according to an embodiment of the present invention. The power system 200 includes a circuit breaking arrangement 100 according to an embodiment of the present invention, e.g. as described above with reference to any one of FIGS. 1-3. The circuit breaking arrangement 100 is adapted to be coupled to a transmission line 101, arranged to carry direct current, for controllably effecting discontinuation of flow of direct current in the transmission line 101. In FIG. 4, a portion of transmission line 101 arranged to carry direct current between terminals 115 and 116 is shown. It is to be understood that the transmission line 101 is a part or portion of the power system 200, which e.g. may include or be constituted by a power transmission system such as an HVDC power transmission system or an HVDC grid or a DC grid. However, any other components included in the power system 200 are not shown in FIG. 4. The transmission line 101 may for example be a power transmission line such as a DC cable, an OHL or a combination of DC cable and OHL.

Figure 5:
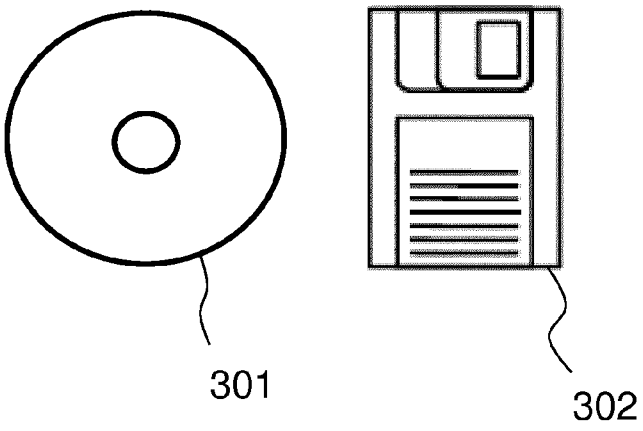
FIG. 5 is a schematic view of computer-readable means carrying computer program code according to embodiments of the present invention.

Referring now to FIG. 5, there is shown a schematic view of computer-readable means 301, 302 carrying computer program code according to embodiments of the present invention. The computer-readable means 301, 302 or computer program code is adapted to executed in a control unit of a circuit breaking arrangement according to an embodiment of the present invention, e.g. as described above with reference to any one of FIGS. 1-3.

The computer-readable means 301, 302 or computer program code is configured to, when executed in the control unit of the circuit breaking arrangement, cause the current sensing unit to sense a direction of direct current flowing into the current interrupter unit, cause actuation of the current interrupter unit to interrupt current in the transmission line, and, based on the sensed current direction, selectively activate at least one of the first and the at least a second resonance circuit so that at least one resonance current is generated which superposes current of any arc generated in the current interrupter unit after actuation thereof, which generated at least one resonance current has an opposite direction to the sensed current direction at least during the predefined period immediately after actuation of the current interrupter unit.

The computer-readable means 301, 302, or computer readable storage mediums, shown in FIG. 5 include a Digital Versatile Disc (DVD) 301 and a floppy disk 302. Although only two different types of computer-readable means 301, 302 are depicted in FIG. 5, the present invention encompasses embodiments employing any other suitable type of computer-readable means or computer-readable digital storage medium, such as, but not limited to, a nonvolatile memory, a hard disk drive, a CD, a Flash memory, magnetic tape, a USB memory device, a Zip drive, etc.

The control, and/or processing, unit of the circuit breaking arrangement may include or be constituted for example by any suitable CPU, microcontroller, DSP, ASIC, FPGA, etc., or any combination thereof. The control unit may optionally be capable of executing software instructions stored in a computer program product e.g. in the form of a memory. The memory may for example be any combination of RAM and ROM. The memory may comprise persistent storage, which for example can be a magnetic memory, an optical memory, a solid state memory or a remotely mounted memory, or any combination thereof.

In conclusion, there is disclosed a circuit breaking arrangement, which is adapted to be coupled to a transmission line arranged to carry direct current for controllably effecting discontinuation of flow of direct current in the transmission line. The circuit breaking arrangement comprises a current interrupter unit adapted to, when actuated, interrupt current in the transmission line and a first resonance circuit and at least a second resonance circuit. Each of the first and the at least a second resonance circuit is adapted to, upon actuation of the current interrupter unit and when the respective resonance circuit is activated, generate a resonance current superposing current of any arc generated in the current interrupter unit after actuation thereof. At least during a predefined period immediately after actuation of the current interrupter unit a resonance current that has been generated by the first resonance circuit flows into the current interrupter unit from a different direction than a resonance current generated by the second resonance circuit would have, or vice versa.

While the present invention has been illustrated and described in detail in the appended drawings and the foregoing description, such illustration and description are to be considered illustrative or exemplifying and not restrictive;

the present invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A circuit breaking arrangement adapted to be coupled to a transmission line of a High Voltage Direct Current, HVDC, power transmission system, the circuit breaking arrangement being arranged to carry direct current for controllably effecting discontinuation of flow of direct current in the transmission line, the circuit breaking arrangement comprising:

- a current interrupter unit adapted to, when actuated, interrupt current in the transmission line; and
- a first resonance circuit and at least a second resonance circuit, each of the first and the at least a second resonance circuit being connected in parallel with the entire current interrupter unit,
  - wherein each of the first and the at least a second resonance circuit is adapted to, upon actuation of the current interrupter unit and when the respective resonance circuit is activated, generate a resonance current superposing current of any arc generated in the current interrupter unit after actuation thereof,
  - wherein the first and the at least a second resonance circuit and the current interrupter unit are configured such that, at least during a predefined period immediately after actuation of the current interrupter unit, a resonance current generated by the first resonance circuit flows into the current interrupter unit from a different direction compared to a resonance current generated by the second resonance circuit, and
  - wherein each of the first and the at least a second resonance circuit includes at least one capacitor, at least one inductor and a switch element, wherein the resonance current is generated upon closing of the switch element by means of successive discharging and charging of the at least one capacitor;
- a current sensing unit adapted to sense at least a direction of direct current flowing into the current interrupter unit prior to actuation thereof; and
- a control unit coupled to the current sensing unit and to each of the first and the at least a second resonance circuit,
- wherein the control unit is adapted to, based on the sensed current direction, selectively activate at least one of the first and the at least a second resonance circuit so that at least one resonance current is generated which superposes current of any arc generated in the current interrupter unit after actuation thereof, which generated at least one resonance current has an opposite direction to the sensed current direction at least during the predefined period immediately after actuation of the current interrupter unit.

2. The circuit breaking arrangement according to claim 1, wherein the predefined period is the first half cycle of the resonance current.

3. The circuit breaking arrangement according to claim 1, wherein the first resonance circuit is connected in parallel with the second resonance circuit, or vice versa.

4. The circuit breaking arrangement according to claim 1, wherein the respective capacitors in the first and second resonance circuits are arranged so that the charging polarities of the respective capacitors in the first and second resonance circuits are such that, at least during the predefined period immediately after actuation of the current interrupter unit, a resonance current generated by the first resonance circuit flows into the current interrupter unit from a different direction compared to a resonance current generated by the second resonance circuit.

5. The circuit breaking arrangement according to claim 1, wherein the charging polarities of the respective capacitors in the first and second resonance circuits are the same.

6. A High Voltage Direct Current, HVDC, power transmission system, comprising:

- a transmission line arranged to carry direct current; and
- the circuit breaking arrangement according to claim 1 coupled to the transmission line for controllably effecting discontinuation of flow of direct current in the transmission line.

7. A computer program product adapted to be executed in a control unit of a circuit breaking arrangement of a High Voltage Direct Current, HVDC, power transmission system, the circuit breaking arrangement being adapted to be coupled to a transmission line arranged to carry direct current for controllably effecting discontinuation of flow of direct current in the transmission line, the circuit breaking arrangement comprising:

- a current interrupter unit adapted to, when actuated, interrupt current in the transmission line; and
- a first resonance circuit and at least a second resonance circuit, each of the first and the at least a second resonance circuit being connected in parallel with the entire current interrupter unit and including at least one capacitor, at least one inductor and a switch element, and a current sensing unit adapted to sense at least a direction of direct current flowing into the current interrupter unit prior to actuation thereof,
- wherein the control unit is coupled to the current sensing unit and to each of the first and the at least a second resonance circuit, wherein each of the first and the at least a second resonance circuit is adapted to, upon actuation of the current interrupter unit and when the respective resonance circuit is activated, generate a resonance current superposing current of any arc generated in the current interrupter unit after actuation thereof, and wherein the first and the at least a second resonance circuit and the current interrupter unit are configured such that, at least during a predefined period immediately after actuation of the current interrupter unit, a resonance current generated by the first resonance circuit flows into the current interrupter unit from a different direction compared to a resonance current generated by the second resonance circuit,
- the computer program product comprising a non-transitory computer-readable medium carrying computer program code configured to, when executed in the control unit of the circuit breaking arrangement:
- cause the current sensing unit to sense a direction of direct current flowing into the current interrupter unit;
- cause actuation of the current interrupter unit to interrupt current in the transmission line; and
- based on the sensed current direction, selectively activate at least one of the first and the at least a second resonance circuit so that at least one resonance current is generated which superposes current of any arc generated in the current interrupter unit after actuation thereof, which generated at least one resonance current has an opposite direction to the sensed current direction at least during the predefined period immediately after actuation of the current interrupter unit, wherein the resonance current is generated upon closing of the switch element by means of successive discharging and charging of the at least one capacitor.

8. The circuit breaking arrangement according to claim 2, wherein the first resonance circuit is connected in parallel with the second resonance circuit, or vice versa.

9. The circuit breaking arrangement according to claim 2, wherein the respective capacitors in the first and second resonance circuits are arranged so that the charging polarities of the respective capacitors in the first and second resonance circuits are such that, at least during the predefined period immediately after actuation of the current interrupter unit, a resonance current generated by the first resonance circuit flows into the current interrupter unit from a different direction compared to a resonance current generated by the second resonance circuit.

10. The circuit breaking arrangement according to claim 3, wherein the respective capacitors in the first and second resonance circuits are arranged so that the charging polarities of the respective capacitors in the first and second resonance circuits are such that, at least during the predefined period immediately after actuation of the current interrupter unit, a resonance current generated by the first resonance circuit flows into the current interrupter unit from a different direction compared to a resonance current generated by the second resonance circuit.

11. The circuit breaking arrangement according to claim 2, wherein the charging polarities of the respective capacitors in the first and second resonance circuits are the same.

12. The circuit breaking arrangement according to claim 3, wherein the charging polarities of the respective capacitors in the first and second resonance circuits are the same.

13. The circuit breaking arrangement according to claim 4, wherein the charging polarities of the respective capacitors in the first and second resonance circuits are the same.

14. A High Voltage Direct Current, HVDC, power transmission system, comprising:

a transmission line arranged to carry direct current; and the circuit breaking arrangement according to claim 1 coupled to the transmission line for controllably effecting discontinuation of flow of direct current in the transmission line.

15. A High Voltage Direct Current, HVDC, power transmission system, comprising:

a transmission line arranged to carry direct current; and the circuit breaking arrangement according to claim 1 coupled to the transmission line for controllably effecting discontinuation of flow of direct current in the transmission line.

16. A High Voltage Direct Current, HVDC, power transmission system, comprising:

a transmission line arranged to carry direct current; and the circuit breaking arrangement according to claim 1 coupled to the transmission line for controllably effecting discontinuation of flow of direct current in the transmission line.

17. A High Voltage Direct Current, HVDC, power transmission system, comprising:

a transmission line arranged to carry direct current; and the circuit breaking arrangement according to claim 1 coupled to the transmission line for controllably effecting discontinuation of flow of direct current in the transmission line.

* * * * *